United States Patent [19]

Clark

[11] Patent Number: 5,787,468
[45] Date of Patent: Jul. 28, 1998

[54] COMPUTER SYSTEM WITH A CACHE COHERENT NON-UNIFORM MEMORY ACCESS ARCHITECTURE USING A FAST TAG CACHE TO ACCELERATE MEMORY REFERENCES

[75] Inventor: Roy E. Clark, Hopkinton, Mass.

[73] Assignee: Data General Corporation, Westboro, Mass.

[21] Appl. No.: 665,065

[22] Filed: Jun. 11, 1996

[51] Int. Cl.$^6$ .................................. G06F 13/00
[52] U.S. Cl. .......................... 711/121; 711/148
[58] Field of Search ....................... 711/120, 121, 711/124, 130, 148

[56] References Cited

U.S. PATENT DOCUMENTS

| | | | |
|---|---|---|---|
| 4,483,003 | 11/1984 | Beal | 371/51.1 |
| 5,265,235 | 11/1993 | Sindhu et al. | 711/120 |

*Primary Examiner*—David L. Robertson
*Attorney, Agent, or Firm*—Donald A. Lewine; Robert L. Dulaney

[57] ABSTRACT

A fast tag cache is an array to cache a limited set of identifiers specifying the residency and access rights to memory blocks and cache blocks contained in a node within a distributed memory system built using a cache coherent non-uniform memory access architecture. The purpose of the fast tag array is to ensure peak processor-memory bus throughput each node and minimize the amount of memory required to hold cache state information.

15 Claims, 5 Drawing Sheets

Normal Pentium Pro Pipelined Bus Protocol

| TIME | REQ | SNOOP | RESP | DATA |
|------|-----|-------|------|------|
| 1    | A   |       |      |      |
| 2    |     |       |      |      |
| 3    |     |       |      |      |
| 4    | B   |       |      |      |
| 5    |     | A     |      |      |
| 6    |     |       |      |      |
| 7    | C   |       | A    |      |
| 8    |     | B     |      | A    |
| 9    |     |       |      |      |
| 10   |     |       | B    |      |
| 11   |     | C     |      | B    |
| 12   |     |       |      |      |
| 13   |     |       | C    |      |
| 14   |     |       |      | C    |

Fig. 3

Deferred Transaction Using Fast Tags

| TIME | REQ | SNOOP | RESP | DATA |
|---|---|---|---|---|
| 1 | A | | | |
| 2 | | | | |
| 3 | | | | |
| 4 | B | | | |
| 5 | | A | | |
| 6 | | | | |
| 7 | C | | A | |
| 8 | | B | | A |
| 9 | | | | |
| 10 | | | B | |
| 11 | | C | | |
| 12 | | | | |
| 13 | | | C | |
| 14 | | | | C |
| 15 | | | | |
| 16 | | | | |
| 17 | | | | |
| 18 | | | | |
| 19 | | | | |
| 20 | | | | |
| ... | | | | |
| ... | | | | |
| ... | | | | |
| ... | | | | |
| ... | | | | |
| N | | | | B |

COMPUTER SYSTEM WITH A CACHE COHERENT NON-UNIFORM MEMORY ACCESS ARCHITECTURE USING A FAST TAG CACHE TO ACCELERATE MEMORY REFERENCES

CROSS REFERENCE TO RELATED APPLICATIONS

There are no related applications.

BACKGROUND—FIELD OF THE INVENTION

This invention is related to the field of data processing. More particularly, it is related to distributed memories having coherent data and caches with cache status data bits employed in that field.

BACKGROUND—DESCRIPTION OF PRIOR ART

This invention relates to connecting multiple computer systems together using a high-speed bus such that all of the computer systems share a single coherent address space.

There has been a great deal of work in this area including work generated by an IEEE Standards Committee which produced IEEE Std 1596-1992 IEEE Standard for Scalable Coherent Interface (SCI). That standard provides good background for the present invention and is incorporated by reference herein.

Cache memories have been in use since the 1960's and are now very well known by those in the computer field. A cache is a small fast memory used to hold a recently used subset of a larger memory. Recently used data is likely to be used again in the near future. Vast amounts of experimental data have shown this to be correct.

It became clear that if one cache was good, then multiple caches could be better. U.S. Pat. No. 4,471,430 issued to Paul Bowden, et al on Sep. 11, 1984, and shows a multi-level cache where a second cache is connected to the first cache. The advantages of duplicate cache directories were described in U.S. Pat. No. 4,471,429 issued to Marion G. Porter also on Sep. 11, 1984. Porter teaches using a duplicate cache directory to accelerate selective cache clearing.

The prior art also teaches multi-way set associative cache directories. U.S. Pat. No. 4,493,026 issued to Howard T. Olnowich on Jan. 8, 1985 discloses a set associative cache.

When multiple processors all share data but have private caches there is a need to keep all of the caches consistent or coherent. U.S. Pat. No. 4,992,930 issued to Amy E. Gilfeather, et al on Feb. 12, 1991 describes a duplicate directory unit which maintains an identical copy of the cache memory directory. This duplicate copy is used by the bus watcher unit to detect the occurrence of a condition which could result in cache incoherency. The bus watcher unit can snoop the bus in parallel with the processors use of the primary cache directory. U.S. Pat. No. 5,148,533 issued to Thomas F. Joyce, et al on Sep. 15, 1992 shows a similar duplicate directory used for bus snooping.

U.S. Pat. No. 5,394,555 issued to John C. Hunter on Feb. 28, 1995 shows a multi-node computer system incorporating an external coherency unit at each node to insure integrity of information in a shared, distributed memory. The external coherency unit required a significant amount of additional hardware to be added to the basic system just for cache coherency.

All of the prior art either required modification to the design of the CPU or required a large amount of external hardware or both.

In the prior art, even when cache tags were duplicated to provide parallel access, the duplicate tags were as large as the primary tags. A significant feature of the present invention is that the duplicate tags are chosen to be smaller and faster than the primary tags. This feature allows for adding a small number of chips to an otherwise standard high-volume design and creates a multi-node computer system where each processor in each node operates at maximum performance. Without this invention, the shortcomings of the prior art, such as, requiring many more chips would remain.

OBJECTS AND ADVANTAGES

It is a broad objective of the present invention to provide an improved computer system.

It is a further objective of the present invention is to build a multi-node computer system which uses high-volume standard microprocessors, memory controllers, mother boards and interconnects and add the minimum hardware possible to achieve cache coherency.

It is another objective of the present invention to use commercial microprocessors produced in high volume and at relatively low cost by vendors, for example, Intel and Motorola, without making any modifications to the cache coherency protocols built into those chips for the purpose of producing high-end computer systems with the economics of scale of personal computers.

It is yet another objective of the present invention to operate such microprocessors at their maximum possible performance level.

It is still another objective of the present invention to reduce the amount of fast, expensive static memories and still achieve very high performance.

SUMMARY

The present invention takes a set of standard high-volume mother boards and adds logic that enables them to work together as a multi-node computer system.

When a microprocessor makes a request for data from system memory the microprocessor must determine if the local memory contains the desired information or if the latest copy of the information is in a cache in another microprocessor or on another node. To achieve maximum performance, the status information must be provided at a short predetermined amount of time after the request. The present invention uses a small fast tag cache to keep track of the status of recently referenced memory blocks. The fast tags can then respond to memory requests in the required time period.

When there is a miss in the fast tag cache, the memory system is able to defer the memory operation and allow other operations to take place responding with the desired information at a later time and possibly out of order.

Since the fast tags are implemented using a cache, there is no need for a duplicate tag for every entry in main memory on in the main cache. The cost of the fast tags are reduced and it also allows the multi-node cache coherency hardware to fit into standard personal computer packaging.

The system is built out of multiple nodes. Each one of the nodes has one or more microprocessors. These microprocessors make memory requests which require a snoop response before they can be completed. This snoop response is either status information indicating if any microprocessors have a newer copy of the data in their cache or it can be a defer response indicating that the information will be supplied at a later time. All of the microprocessors are connected to a local bus along with a local memory. There is also a cache and directory controller (CDC) connected to the local bus.

There is a system bus connecting several nodes together. The CDC on each node is required to keep memory coherent across the nodes. There is a small fast tag memory connected to each CDC which can enable the CDC to correctly respond to each memory request from the microprocessors within the required snoop window.

PREFERRED EMBODIMENT

The description of the preferred embodiment includes an explanation on use of the invention with Intel Pentium® Pro processors and the aforementioned IEEE Scalable Coherent Interface (SCI) as the system bus, which illustrate the best mode for practicing the present invention. These specific examples of usage should not be considered as limits on the scope of this patent, because the invention disclosed and claimed herein could be made to work with other devices, for example, a Motorola PowerPC® 601.

Figure 1:
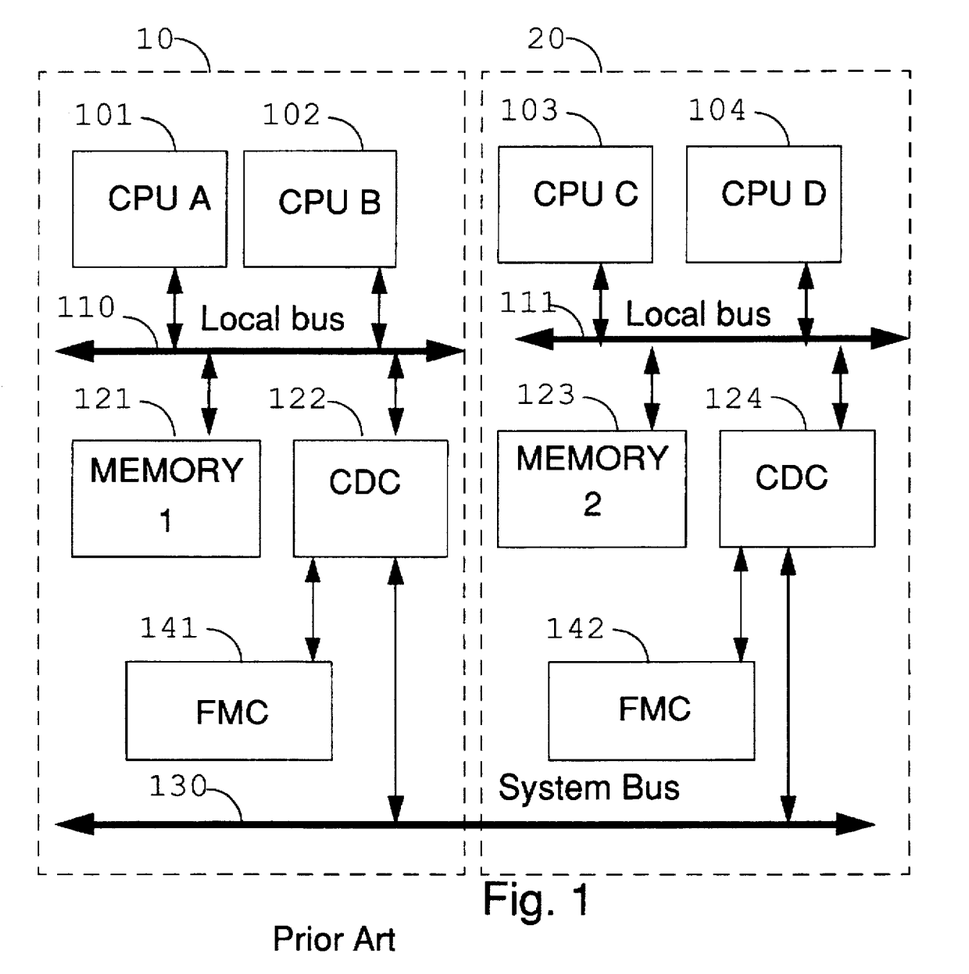
FIG. 1 is a block diagram of a typical multi-processor system.

The system configuration is shown in FIG. 1. The computer system is composed of multiple nodes 10, 20. The nodes are connected together by a system bus 130. Each node has a local bus 110, 111 and one or more microprocessors 101, 102, 103, 104 and a memory 121, 123 connected to the local bus 110, 111. There is also a Cache and Directory Controller (CDC) 122, 124 connected to the system bus 130 and a local bus 110, 111. The general operation of computer systems as shown in FIG. 1 is described in the aforementioned IEEE Std 1596-1992 and is understood by those of ordinary skill in this art.

The system configuration shown in FIG. 1 only has two nodes 10, 20 and each node only has two CPUs 101, 102, and 103, 104. A typical system configuration would have four CPUs on each node and could have several additional nodes. Adding more CPUs or more nodes to the description would only make it less concise and would not teach anything above what is shown in FIG. 1. It will be understood that there may be more than two CPUs on any local bus and there may be more than two nodes on the system bus 130. System bus 130 may also be implemented in a number of different ways from a classic backplane bus to a full cross-bar switch or any other connection scheme. The present invention does not depend on the implementation of system bus 130.

In FIG. 1, CPU 101, 102, 103, 104 could be Intel Pentium® Pro microprocessors. Memory 1 121, memory 2 123, FMC 141 and FMC 142 could all be standard dynamic random access memories. CDC 122 and CDC 124 could be gate arrays, such as, those built by LSI Logic. Local bus 110 and local bus 111 could be etch on a printed circuit board and system bus 130 could be IEEE Scalable Coherent Interconnect as described in the earlier-mentioned IEEE Std 1596-1992.

One key property of the computer system is that the combined memories 121 and 123 are treated as a single address space. For example, Memory 1 121 may hold addresses from 0 to 4000 and Memory 2 123 may hold addresses from 4001 to 10000. When CPU A 101 needs to access memory location 5000, for example, the CDC 122 on node 10 routes the request to the system bus 130 and the CDC 124 on node 20 receives the request from the system bus 130 and routes it to Memory 2 123.

Memory on the same node as a CPU is termed "near memory" to that CPU and memory on a different node is termed "far memory."

The nodes do not need to all have the same amount of memory or the same number of CPUs.

Each CPU 101, 102, 103, 104 also has an internal cache (not shown) which contains recently used modified and unmodified data. These internal caches may contain modified data from memory 1 121 or memory 2 123.

Each node 10, 20 has a Far Memory Cache (FMC) 141, 142 connected to its CDC 122,124. The FMCs 141, 142 store several kinds of information: (1) blocks of data from memories in other nodes, (2) the status of blocks in the local memory and (3) the status of data blocks from other nodes. The FMC is typically from 16 Mb to 128 Mb in size. The FMCs 141, 142 reduce traffic on system bus 130 by holding information from far memory on the local node. For example, if CPU A 101 on node 10 reads a byte from memory 2 123 on node 20, that byte has to pass onto local bus 111 through CDC 124 onto system bus 130 through CDC 122 onto local bus 110 and into CPU A. When this read happens CDC 122 also stores a copy of the byte in FMC 141 so subsequent reads of that byte can be performed from FMC 141 and do not require transactions on system bus 130.

The *Pentium® Pro Family Developer's Manual, Volume 1 Specifications*, Intel order number 242690 is incorporated by reference herein. To better describe the present invention, some of the important highlights from that manual are summarized below. The Intel manual is the definitive authority on the operation of the Pentium® Pro microprocessor.

The Pentium Pro processor bus enables multiple Pentium Pro processors to operate on one bus with no external support logic. The Pentium Pro processor requires no separate snoop generation logic. The processor I/O buffers can drive the Pentium Pro processor bus in a multi-processor system.

The Pentium Pro processors and bus support a MESI cache protocol in the internal caches. The cache protocol enables direct cache-to-cache line transfers.

Pentium Pro processor bus agents issue transactions to transfer data and system information. A bus agent is any device that connects to the processor bus including the Pentium Pro processors themselves. Referring to FIG. 1, CPU A 101, CPU B 102, memory 1 121, and CDC 122 are bus agents on local bus 110 and CPU C 103, CPU D 104, memory 2 123, CDC 124 are bus agents on local bus 111.

A particular bus agent can have one or more of several roles in a transaction: A requesting agent is the agent that issues the transaction. An addressed agent is the agent that is addressed by the transaction. A snooping agent is a caching bus agent that observes ("snoops") bus transactions to maintain cache coherency. The agent that provides the response is called the responding agent and is typically the addressed agent.

Each transaction has several phases that include some or all of the following phases:

1. Arbitration Phase. No transaction can be issued until the bus agent owns the bus. The details of bus arbitration are not relevant for the present invention.
2. Request Phase. This is the phase where the transaction is actually issued to the bus. All transactions must have this phase.
3. Error Phase. Any errors that occur during the request phase are reported in the error phase. All transactions must have this phase.
4. Snoop Phase. This is the phase where coherency is enforced. All caching agents must report status (CLEAN, MODIFIED, or SHARED) in this phase. There is a DEFER signal that is sampled during the snoop phase to determine if a transaction can be guaranteed in-order completion at that time. If the DEFER signal is asserted, only two responses are allowed by the bus protocol during the response phase, the deferred response or the retry response. If the deferred response is given, the responding agent must later complete the transaction with a deferred reply transaction. All memory transactions must have this phase.
5. Response Phase. The response agent drives the response during this phase. All transactions must have this phase. The possible responses are:
   (i) Idle.
   (ii) Retry.
   (iii) Deferred response. The data will be supplied in a later deferred reply transaction.
   (iv) Hard failure.
   (v) No data.
   (vi) Implicit writeback response. A snooping agent will transfer data on the data bus. Memory agent must merge writeback data with any transaction data and provide the response.
   (vii) Normal data response.
6. Data Phase. The response agent drives or accepts the transaction data, if there is any.

The snoop phase occurs four clocks after the transaction's request phase begins, or three clocks after the previous snoop results, whichever is later. On observing a request phase for a memory access, all caching agents are required to perform an internal snoop operation and return status information (CLEAN, MODIFIED, or SHARED) to indicate whether the requested line is valid or invalid in the snooping agent and whether the line is modified in the caching agent. The caching agent can also extend the snoop phase. Extending the snoop phase reduces system performance.

Using the present invention the snoop phase is never extended. The DEFER signal is also driven in the snoop phase. If DEFER is not asserted then the transaction can be guaranteed in-order completion during the data phase. There are three valid responses when DEFER is asserted: the deferred response, implying the operation will be completed at a later time; a retry response, implying the transaction should be retried; or a hard error response.

Now, referring back to FIG. 1, both CDC 122 and CDC 124 are bus agents required to respond during the snoop phase of every memory transaction. However, the information required to respond is stored in FMC 141 and FMC 142. FMC 141 and FMC 142 are typically implemented using inexpensive, but relatively slow dynamic random access memory chips (DRAMs). With DRAM-based FMC's it is not possible to obtain status information in the available time (four clocks) to respond within the normal snoop phase of a bus transaction. There are several possible design choices:

1. Extend the snoop phase by stalling the local bus until the information is available. While such an approach would be simple and cheap, it would delay every memory cycle and reduce system performance.
2. Build a fast memory that holds the status of every block in local memory and every entry in the far memory cache. While this scheme would produce maximum performance, it would require a large amount of fast expensive static memory chips.
3. Build a relative small fast tags cache and connect it to the CDC. When there is a match in the fast tags, the CDC is able to provide status during the snoop phase. If there is a miss if the fast tags, the CDC responds with DEFER. By responding with DEFER, the Pentium Pro processors are free to initiate other transactions while the CDC is determining the status of the deferred transaction.

Figure 2:
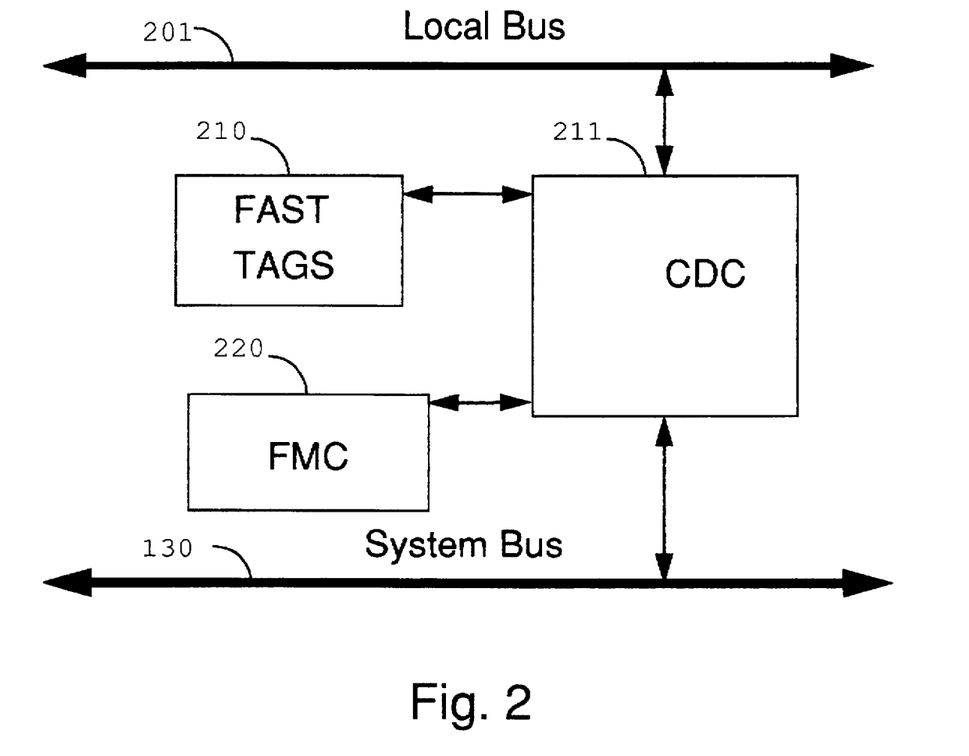
FIG. 2 shows the connection of the fast tags to the cache and directory controller.

FIG. 2 shows the connection of the fast tags 210 to the CDC 211 and the connection of the CDC to the local bus 201, the Far Memory Cache (FMC) 220 and the system bus 130.

In the vast majority of operations on local data the CDC 211 would look in the fast tags 210 and drive a cache status of CLEAN onto the local bus 201.

Figure 3:
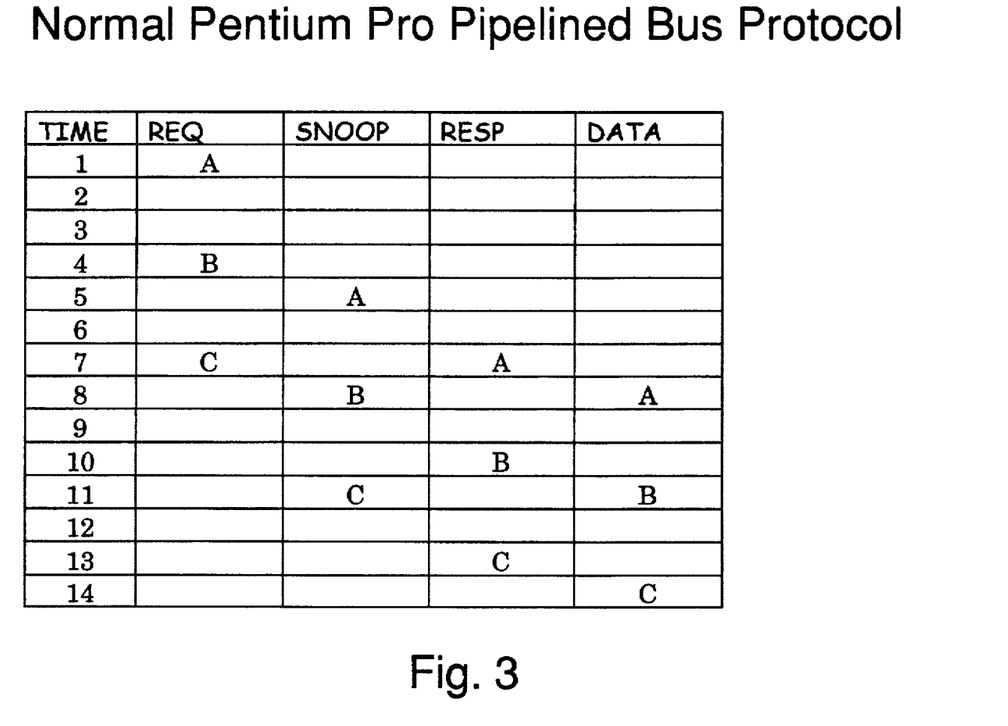
FIG. 3 is a timing chart for the normal Pentium Pro pipelined bus protocol.

The timing is shown in FIG. 3. At time 1 a read request, A, is initiated. At time 4 a read request, B, is initiated. At time 5 (4 clocks after request A) the snoop phase for request A takes place. The fast tags indicate that the status for A is CLEAN and at time 7 a normal data response for request A takes place. Also at time 7 a read request, C, is initiated. At time 8 the snoop phase for request B takes place and again the fast tags indicate that the status for request B is CLEAN at the same time the data for request A is returned from the memory. At time 10 there is a normal data response for request B. At time 11 the snoop phase for request C takes place and the data for request B is returned from the memory. In due course, the data for request C shows up at time 14.

Figure 4:
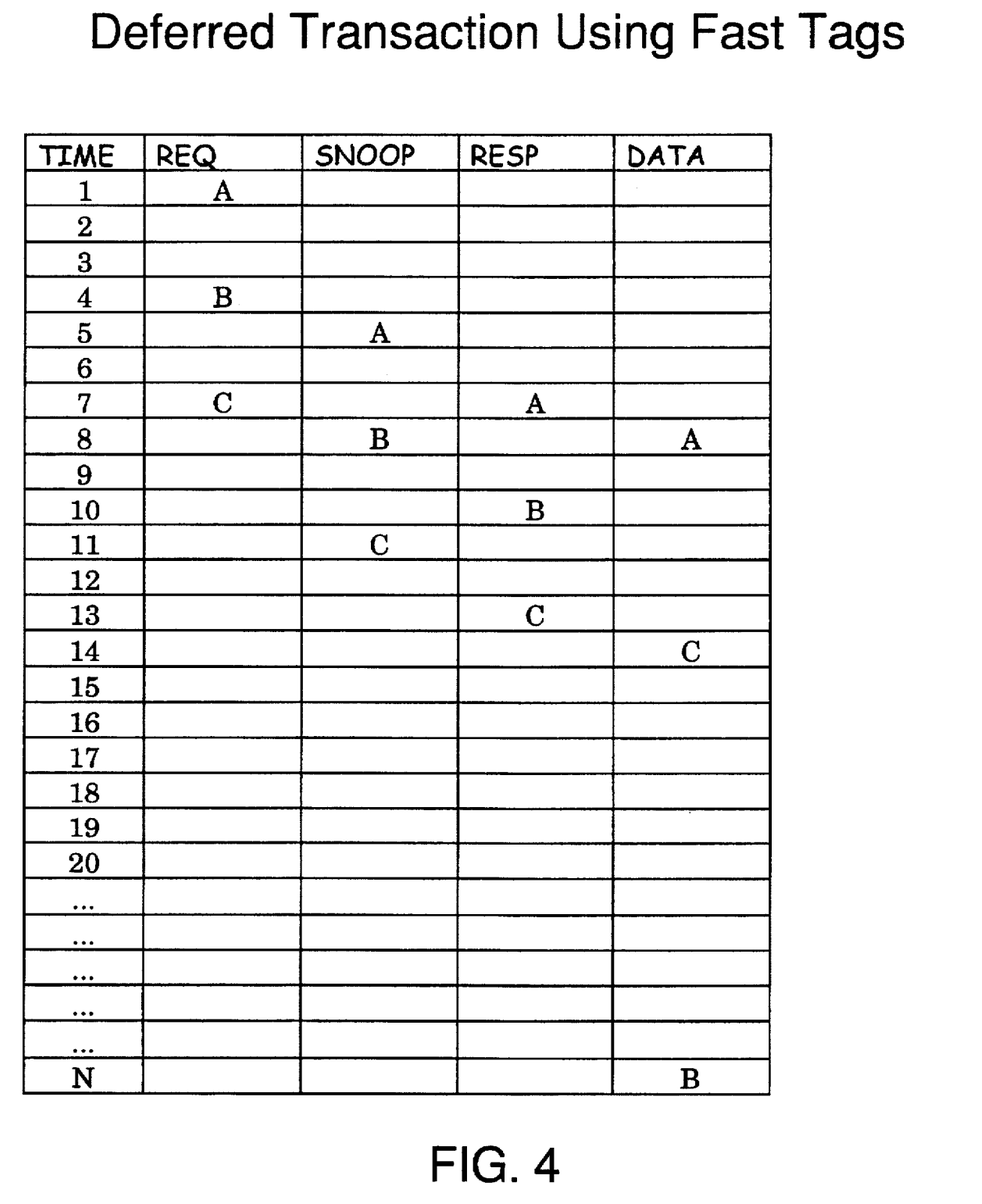
FIG. 4 is a timing chart showing deferred transactions using fast tags.

FIG. 4 shows the use of DEFER. Entries in FIG. 4 are the same as FIG. 3 until time 8. At time 8, there is a miss in the fast tags (or they indicate that the data is on another node) and the CDC asserts DEFER. At time 10 the CDC returns a deferred response which indicates that it will provide the requested data later. Request C is allowed to continue. At some point in the future, possibly after fetching the data from another node, the data for request B is returned.

If the status information is not present in the fast tags, the CDC will assert DEFER and take one of the following actions:

1. If the CDC determines that the requested block was indeed present in the FMC or near memory with the correct access state, then the current access state is written into the fast tags and the requesting Pentium Pro operation is retried. The retry will hit on the fast tags and access either the local memory or the FMC to get the data.
2. If the CDC determines that the requested block was indeed present in the FMC or near memory but had incorrect access state, then the CDC performs the appropriate coherency actions on the system bus to obtain the correct access state of the requested block, this new access states is written into the fast tags and the requesting Pentium Pro operation is retried. The retry will hit on the fast tags and access either the local memory or the FMC to get the data.
3. If the CDC determines that the requested block is not present in the FMC or near memory, then the data block is retrieved from a remote node and forwarded to the requesting Pentium Pro. The data block is also written into the FMC (possibly displacing older data), or into near memory and the new access state is written into the fast tags which completes the operation.

4. If for various reasons, such as lack of buffer space, the CDC is unable to service any of the above requests, then the CDC returns a retry status and the requesting Pentium Pro agent's operation is retried.

5. If for any reason the CDC detects an error while performing the above requests, then the CDC returns an error status and the requesting Pentium Pro agent is notified.

Fast tags are stored two wide in static RAM to implement a 2-way set associative cache. In the preferred embodiment the static RAMs are mounted on SIMMs. The cache addressing supports 256K×32, 1M×32 and 4M×32 SIMM devices. The tag information for each member within the set contains: 1) upper most address bits for comparison (12-bits in the preferred embodiment); 2) state information indicating the access rights to the memory block; and 3) parity.

The possible states are:

STATE

Imprecise; State is unknown
No Access
Read Access
Read-Write Access

A "fast tag match" for a member within a selected set as the upper most address bits on the local bus 201 matches the address stored in the fast tags 210 and the state is not Imprecise and there is good parity. Reading a state of Imprecise or getting bad parity is therefore considered a miss.

Firmware is responsible for setting all of the fast tag entries with valid parity on powerup and hard resets.

There are many ways to implement the fast tags. The preferred embodiment shown in detail in FIG. 5. The address is sent from the CDC 211. The lower bits of address are used to address the tag array RAMs. In the preferred embodiment there are two banks of fast tags 510 and 511. More banks are implied by the dots between 510 and 511. The fast tags are implemented using one or two 32-bit Single In-line Memory Modules (SIMMs). However, there could be more SIMMs used to build a fast tag that is more than two way associative.

Figure 5:
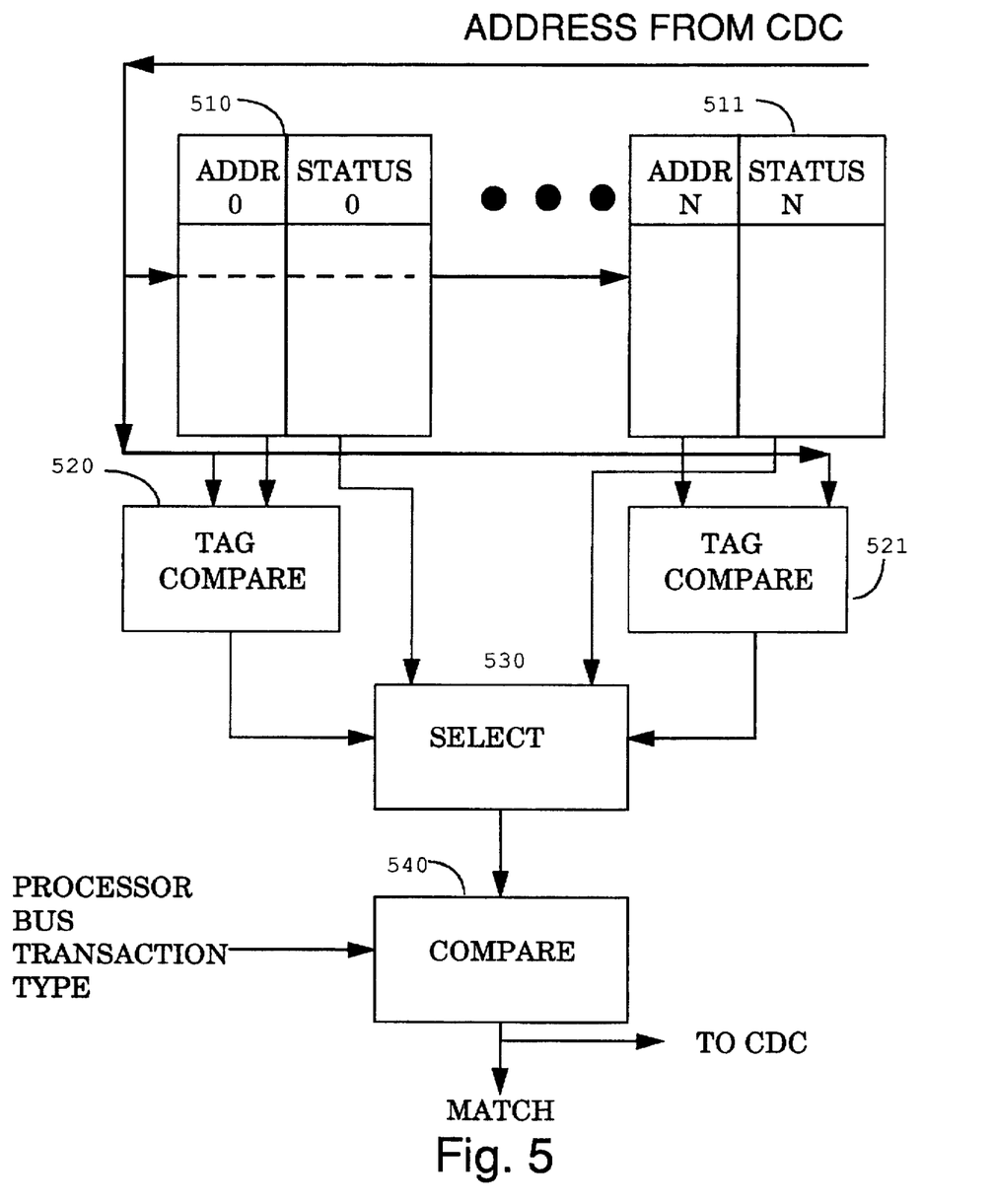
FIG. 5 shows the preferred embodiment of the fast tags.

The output of each bank of tags is sent to a comparator and the upper bits of the address from CDC 211 are compared with the output from the tag RAMs. The output of RAM 510 is compared by comparator 520. The output of RAM N 511 is compared by comparator 521. One could implement additional tag RAMs and use additional comparators to compare more addresses in parallel.

Selector 530 selects the matching entry from comparator 520 or 521, if any. Comparator 540 compares the output of selector 530 with the transaction type from the CDC 211. If neither of comparators 520 or 521 compare equal, or one compares equal but the status is incorrect for this transaction type, then the MATCH signal from the fast tags is false which generates a miss and asserts DEFER during the snoop phase. Otherwise the fast tags drive the status during the snoop phase.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

What is claimed is:

1. A computer system comprising:
   (a) a system bus for transmitting at least addresses and data;
   (b) a plurality of nodes, each one of said nodes being connected to said system bus and comprising:
      (i) one or more microprocessors capable of issuing memory requests where each one of said memory requests has a request address and requires a snoop response before said memory request can continue, said snoop responses being either status information or a defer indicator;
      (ii) a local memory having multiple addressable locations for storing said data;
      (iii) a local bus connected to at least one of said microprocessors and said local memory;
      (iv) a cache memory for storing data from other of said nodes;
      (v) a tag memory for storing status information and addresses for a subset of entries in said cache memory; and
      (vi) a cache and directory controller (CDC) connected to said local bus, said system bus, said cache memory and said tag memory, wherein said CDC issues a snoop response to a received request address, said snoop response containing address-matching status information associated with said received request address if said tag memory contains an address matching said received request address or containing a defer indicator if said tag memory does not contain an address matching said received request address.

2. The computer system according to claim 1, where said tag memory is relatively small and relatively fast compared to said cache memory.

3. The computer system according to claim 1, where each location in each local memory in said computer system has a unique address on said system bus.

4. The computer system according to claim 3, where any one of said request addresses may refer to any location in any one of said local memories.

5. The computer system according to claim 1, where each one of said microprocessors is an Intel Pentium Pro.

6. The computer system according to claim 1, where said snoop response always occurs four clock periods after issuance of said memory request.

7. The computer system according to claim 1, where said tag memory is organized as a set associative cache.

8. The computer system according to claim 7, where the number of sets is two.

9. In a computer system having a plurality of nodes where each said node has:
   I. one or more microprocessors capable of issuing memory requests where each one of said memory requests contains a request address and requires a snoop response before said memory request can continue;
   II. a local memory for storing data;
   III. a local bus connected to at least one of said microprocessors and said local memory;
   IV. a relatively large relatively slow cache memory for storing data from other nodes;
   V. a relatively small relatively fast tag memory for storing addresses for a subset of the data entries in said cache memory and status information associated with each of said addresses; and VI. a cache and directory controller (CDC) connected to said local bus, said system bus, said cache memory and said tag memory;

a method for maintaining peak performance on said local bus when one of said microprocessors issues a request address comprising:

(a) looking in the tag memory on the same node as the microprocessor issuing said request address for an address matching said request address;

(b) responding with the associated status information if said matching address is found in said tag memory; and (c) responding with DEFER if said matching address is not found in said tag memory.

10. The method according to claim 9 where said looking step (a) additionally comprises:

(a1) checking the parity of said tag memory; and (a2) ignoring tag entries with parity errors.

11. The method according to claim 9 where said responding step (b) occurs four clock periods after said request address is issued.

12. The method according to claim 9 where said responding step (c) occurs exactly four clock periods after said memory request is issued.

13. A computer system comprising:

(a) at least one microprocessor capable of issuing memory requests where each one of said memory requests has a request address and requires a snoop response before said memory request can continue;

(b) a cache memory;

(c) a tag memory for storing status information and addresses for a subset of entries in said cache memory; and (d) means connected to said at least one of said microprocessors, said cache memory and said tag memory, for responding to requests from any one of said microprocessors with status information if said request address matches an address in said tag memory and with DEFER if said request address does not match said request address.

14. The computer system according to claim 13, where said tag memory is relatively small and relatively fast compared to said cache memory.

15. The computer system according to claim 13, where said snoop response always occurs four clock periods after said memory request.

* * * * *